Patented July 15, 1952

2,603,605

UNITED STATES PATENT OFFICE 2,603,605

PROCESS FOR PRODUCTION OF WASHING POWDER FROM A NORMALLY OILY LIQUID SYNTHETIC SOAPLESS DETERGENT

Frederick J. Pollok, Troon, Scotland, assignor to Imperial Chemical Industries Limited, a corporation of Great Britain No Drawing. Application February 4, 1949, Serial No. 74,695. In Great Britain March 15, 1948

3 Claims. (Cl. 252—156)

The present invention relates to compositions containing soapless detergents and particularly compositions containing synthetic soapless detergents which are oily liquids.

The object of the present invention is to provide washing powders containing soapless detergents and particularly washing powders containing synthetic soapless detergents which are oily liquids, in which powders the soapless detergents do not tend to separate on storage from the inorganic constituents used to make up the powders.

Washing powders, according to the invention, comprise an admixture in powder form of inorganic solid ingredients of the kind usually included in washing powders and a jelly formed in an aqueous medium on the addition of a water-soluble cellulose ether to a soapless detergent of the kind which is an oily liquid as, for example, polyethylene oxide condensation product of an alkyl phenol.

According to the present invention the process for the production of washing powders comprises treating in an aqueous medium a soapless detergent of the kind which is an oily liquid as, for example, polyethylene oxide condensation product of an alkyl phenol with a water-soluble cellulose ether and admixing the jelly thus formed with such a quantity of inorganic solid ingredients of the kind usually included in washing powders that a powdery product is ultimately obtained.

It is usually desirable to produce the said jelly by adding a water-soluble cellulose ether to an aqueous solution of a soapless detergent of the kind which is an oily liquid, as for example, polyethylene oxide condensation product of an alkyl phenol.

Examples of "water-soluble cellulose ether" are a water-soluble methyl ethyl ether of cellulose, a water-soluble methyl ether of cellulose, a water-soluble methyl hydroxy ethyl ether of cellulose, a water-soluble hydroxy ethyl ether of cellulose, and a water-soluble alkali metal salt of a carboxy-methyl cellulose.

Preferably the water-soluble cellulose ether is a water-soluble methyl ethyl cellulose containing between 0.3 and 0.5 methyl groups and 0.8 and 1.0 ethyl groups per glucose unit of cellulose, and having a viscosity approximately 10 centipoises in 1% solution in water at 20° C.

Preferably the water-soluble alkali metal salt of carboxy-methyl cellulose is a water-soluble sodium salt of carboxy-methyl cellulose having between 0.3 and 0.8 sodium carboxy-methyl groups per glucose unit of cellulose, and a viscosity of about 30–50 centipoises in a 1% solution in water at 20° C.

As examples of inorganic solid ingredients of the kind usually included in washing powders are sodium bicarbonate, an equi-molecular mixture of sodium carbonate and sodium bicarbonate, sodium sesqui carbonate, the alkali phosphates, sodium sulphate.

It is found that the washing powders, according to the invention, may be readily packed in cardboard containers, and that they do not exude on storage their soapless detergent constituent. For instance, no oily constituent is found to collect on the bottom of the container. There is thus no consequential waste of the detergent or inconvenience. The composition of the powder in the container also remains throughout of constant composition.

Washing powders, according to the invention, and the process for their production are illustrated according to the following example wherein the parts are parts by weight.

*Example*

Fifty parts of a 30 percent solution of a polyethylene oxide condensation product of an alkyl phenol, which is a liquid oily detergent, are mixed in a Werner Pfleiderer type of mixer with 3 parts of a crude brand of a sodium salt of carboxy-methyl cellulose. The sodium salt of carboxy-methyl cellulose has 0.45 sodium carboxy-methyl groups per glucose unit of cellulose, and a viscosity of about 30 centipoises in a 1% solution in water at 20° C. After the gelatinisation and precipitation of the cellulose ether have taken place, there are added to the precipitated jelly in the mixer 4 parts of an equimolecular mixture of sodium carbonate and sodium bicarbonate and 43 parts of anhydrous sodium sulphate.

I claim:

1. A process for producing non-exuding washing powders from a normally oily, liquid, synthetic, soapless detergent which comprises combining in water, a water-soluble cellulose ether selected from the group consisting of a water-soluble methyl ethyl ether of cellulose, a water-soluble methyl ether of cellulose, a water-soluble hydroxy ethyl ether of cellulose and a water-soluble alkali metal salt of a carboxy-methyl cellulose with an oily, liquid condensation product resulting from the reaction of a polyethylene oxide and an alkyl phenol in sufficient quantity to form a jelly with said cellulose ether, and admixing with said jelly approximately an equal amount by weight of inorganic solid ingredients selected from the group consisting of sodium bicarbonate, sodium carbonate, sodium sesqui carbonate, sodium sulphate and mixtures thereof.

2. A process for producing non-exuding washing powders from a normally oily, liquid, synthetic, soapless detergent which comprises combining in water, a water-soluble methyl ethyl ether of cellulose having between 0.3 and 0.5 methyl groups and 0.8 and 1.0 ethyl groups per glucose unit of cellulose and a viscosity of approximately 10 centipoises in a 1% aqueous solution at 20° C. with an oily, liquid condensation product resulting from the reaction of a polyethylene oxide and an alkyl phenol in sufficient quantity to form a jelly with said cellulose ester and admixing with said jelly approximately an equal amount by weight of inorganic solid ingredients selected from the group consisting of sodium bicarbonate, sodium carbonate, sodium sesqui carbonate, sodium sulphate and mixtures thereof.

3. A process for producing non-exuding washing powders from a normally oily, liquid, synthetic, soapless detergent which comprises combining in water, a water-soluble sodium salt of carboxy-methyl cellulose having between 0.3 and 0.8 sodium carboxy-methyl groups per glucose unit of cellulose, and a viscosity of about 30 to 50 centipoises in a 1% aqueous solution at 20° C. with an oily, liquid condensation product resulting from the reaction of a polyethylene oxide and an alkyl phenol in sufficient quantity to form a jelly with said carboxy-methyl cellulose, and admixing with said jelly approximately an equal amount by weight of inorganic solid ingredients selected from the group consisting of sodium bicarbonate, sodium carbonate, sodium sesqui carbonate, sodium sulphate and mixtures thereof.

FREDERICK J. POLLOK.

REFERENCES CITED

The following references are of record in the file of this patent:

UNITED STATES PATENTS

| Number | Name | Date |
|---|---|---|
| 2,154,977 | Furness et al. | Apr. 18, 1939 |
| 2,335,194 | Nuesslein et al. | Nov. 23, 1943 |

FOREIGN PATENTS

| Number | Country | Date |
|---|---|---|
| 469,334 | Great Britain | July 23, 1937 |